(12) United States Patent
Fukui et al.

(10) Patent No.: US 9,263,771 B2
(45) Date of Patent: Feb. 16, 2016

(54) LITHIUM SECONDARY BATTERY AND METHOD OF MANUFACTURING THE SAME

(75) Inventors: Atsushi Fukui, Moriguchi (JP); Hiroshi Minami, Moriguchi (JP); Yasuyuki Kusumoto, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 1365 days.

(21) Appl. No.: 12/295,182

(22) PCT Filed: Mar. 28, 2007

(86) PCT No.: PCT/JP2007/056655
§ 371 (c)(1),
(2), (4) Date: Sep. 29, 2008

(87) PCT Pub. No.: WO2007/114168
PCT Pub. Date: Oct. 11, 2007

(65) Prior Publication Data
US 2009/0305129 A1    Dec. 10, 2009

(30) Foreign Application Priority Data

Mar. 30, 2006 (JP) .................................. 2006-094846

(51) Int. Cl.
*H01M 4/38* (2006.01)
*H01M 4/58* (2010.01)
(Continued)

(52) U.S. Cl.
CPC .......... *H01M 10/0587* (2013.01); *H01M 4/134* (2013.01); *H01M 2004/021* (2013.01); *Y02E 60/122* (2013.01); *Y10T 29/49115* (2015.01)

(58) Field of Classification Search
CPC ....... H01M 4/13; H01M 4/366; H01M 4/485; H01M 4/625; H01M 4/38; H01M 4/133; H01M 4/027; H01M 10/0525; H01M 4/134; H01M 10/0587; H01M 2004/021

USPC .............. 429/200, 218.1, 221, 231.8, 231.95, 429/217, 231.1
See application file for complete search history.

(56) References Cited

U.S. PATENT DOCUMENTS

| 4,051,305 A * | 9/1977 | Benczur-Urmossy et al. ............................ 429/217 |
| 6,235,427 B1 * | 5/2001 | Idota et al. .................. 429/218.1 |

(Continued)

FOREIGN PATENT DOCUMENTS

| CN | 1753235 A | | 3/2006 |
| DE | WO 2005049492 | * | 2/2005 |

(Continued)

OTHER PUBLICATIONS

Korean Office Action dated Dec. 24, 2010, issued in corresponding Korean Patent Application No. 2008-7021285.

(Continued)

*Primary Examiner* — Kenneth Douyette

(57) ABSTRACT

[Problem] An object of the invention is to provide a lithium secondary battery that shows good cycle performance and at the same time prevents a battery thickness increase due to charge-discharge cycles, and a method of manufacturing such a battery.
[Means for Solving the Problem] A lithium secondary battery includes a negative electrode (2) having a negative electrode current collector (11) and a negative electrode active material layer (12) disposed on the negative electrode current collector (11), a positive electrode (1) having a positive electrode active material, a separator (3), and a non-aqueous electrolyte. The negative electrode active material layer includes negative electrode active material particles and a negative electrode binder, and the negative electrode active material particles include silicon particles and/or silicon alloy particles. The silicon particles and the silicon alloy particles have a crystallite size of 100 nm or less.

16 Claims, 6 Drawing Sheets

(51) Int. Cl.
  *H01M 4/48* (2010.01)
  *H01M 10/0587* (2010.01)
  *H01M 4/134* (2010.01)
  *H01M 4/02* (2006.01)

(56) References Cited

U.S. PATENT DOCUMENTS

| | | | |
|---|---|---|---|
| 6,258,478 | B1 | 7/2001 | Kim |
| 6,413,672 | B1 * | 7/2002 | Suzuki et al. ............ 429/231.95 |
| 7,776,304 | B2 * | 8/2010 | Pridoehl et al. ................ 423/350 |
| 2002/0146623 | A1 * | 10/2002 | Suzuki et al. .............. 429/218.1 |
| 2003/0096168 | A1 | 5/2003 | Kasamatsu et al. |
| 2003/0148185 | A1 * | 8/2003 | Kusumoto et al. ............ 429/233 |
| 2003/0157407 | A1 * | 8/2003 | Kosuzu et al. ............ 429/231.95 |
| 2003/0215711 | A1 * | 11/2003 | Aramata et al. ............ 429/218.1 |
| 2003/0235762 | A1 | 12/2003 | Fukui et al. |
| 2004/0106040 | A1 * | 6/2004 | Fukuoka et al. .............. 429/212 |
| 2005/0118512 | A1 * | 6/2005 | Onuki et al. .................. 429/326 |
| 2006/0003226 | A1 | 1/2006 | Sawa et al. |
| 2006/0019170 | A1 * | 1/2006 | Adachi et al. ................. 429/341 |
| 2006/0024588 | A1 * | 2/2006 | Jito et al. ...................... 429/344 |
| 2006/0068290 | A1 | 3/2006 | Sawa et al. |
| 2007/0172732 | A1 * | 7/2007 | Jung et al. .................. 429/218.1 |
| 2007/0281216 | A1 | 12/2007 | Petrat et al. |

FOREIGN PATENT DOCUMENTS

| | | | |
|---|---|---|---|
| JP | 10-255768 A | | 9/1998 |
| JP | 2001-325958 A | | 11/2001 |
| JP | 2004-22433 A | | 1/2004 |
| JP | 2004-022433 A | | 1/2004 |
| JP | 2004022433 | * | 1/2004 |
| JP | 2004-303593 A | | 10/2004 |
| JP | 2004-311429 A | | 11/2004 |
| JP | 2004-319390 A | | 11/2004 |
| JP | 2004-335271 A | | 11/2004 |
| JP | 2005-11802 A | | 1/2005 |
| JP | 2005-190977 A | | 7/2005 |
| JP | 2005-228565 A | | 8/2005 |
| JP | 2006-120612 A | | 5/2006 |
| KR | 19990066181 A | | 8/1999 |
| KR | 2006-0021899 A | | 3/2006 |
| WO | 2004/109839 A1 | | 12/2004 |
| WO | 2005/096414 A2 | | 10/2005 |

OTHER PUBLICATIONS

R. A. Huggins; "Lithium alloy negative electrodes formed from convertible oxides"; Solid State Ionics 113-115; pp. 57-67, 1998, cited in the spec.
International Search Report of PCT/JP2007/056655, date of mailing Jun. 19, 2007.
Chinese Office Action dated May 25, 2010, issued in corresponding Chinese Patent Application No. 200780010756.2.
Chinese Office Action dated Mar. 2, 2011, issued in corresponding Chinese Patent Application No. 2007800107562.
Chinese Office Action dated Aug. 3, 2011, issued in corresponding Chinese Patent Application No. 200780010756.2.
Japanese Office Action dated Sep. 28, 2011, issued in corresponding Japanese Patent Application No. 2008-508563.

* cited by examiner

LITHIUM SECONDARY BATTERY AND METHOD OF MANUFACTURING THE SAME

TECHNICAL FIELD

The present invention relates to lithium secondary batteries and methods of manufacturing the batteries.

BACKGROUND ART

Various mobile communication devices and mobile electronic devices such as laptop computers have emerged in recent years, and this has lead to a demand for higher capacity batteries as their driving power sources. Lithium secondary batteries, which perform charge-discharge operations by transferring lithium ions between the positive and negative electrodes, have been widely used as the driving power source for the mobile communication devices and the like since the lithium secondary batteries have higher energy density and higher capacity than other types of secondary batteries such as nickel-cadmium batteries. Nevertheless, as the mobile communication devices and other electronic devices have increasingly become smaller and lighter, there has been a demand for further improvements in the energy density and cycle performance of the lithium secondary batteries.

Currently, in common lithium secondary batteries, carbon materials such as graphite are generally used as their negative electrode materials (negative electrode active materials). When using a negative electrode material composed of graphite, lithium occlusion is only possible up to the composition $LiC_6$, and the upper limit of battery capacity is limited to the theoretical capacity 372 mAb/g. This has been an obstacle to achieving a higher battery capacity.

In view of this problem, a lithium secondary battery employing aluminum, silicon, or tin that alloys with lithium as a negative electrode active material with a high energy density per mass and per volume has been reported (see Non-patent Reference 1 indicated below). Among the just-mentioned materials, silicon particularly shows a high theoretical capacity and is therefore promising as a negative electrode active material for the batteries that can achieve a high capacity. Various lithium secondary batteries using silicon as the negative electrode active material have been proposed (see Patent Reference 1 indicated below).

When silicon is used as the negative electrode active material, however, the negative electrode active material undergoes expansion and shrinkage, and consequently, each time the charge and discharge are performed, newly exposed surfaces form in the surface of the negative electrode active material, causing the negative electrode active material to react with the non-aqueous electrolyte. This leads to the problem of deterioration in battery cycle performance. Moreover, the expansion of the negative electrode active material causes an increase in the battery thickness.

To resolve the problems, there has been a proposal to control the reactivity in the newly formed surfaces in the negative electrode active material by improving the non-aqueous electrolyte (see Patent Reference 2 indicated below). Techniques for improving cycle performance by using a negative electrode active material with a small crystallite size have also been proposed (see Patent References 3 and 4 indicated below).

[Patent Reference 1] Japanese Published Unexamined Patent Application No. 10-255768
[Patent Reference 2] WO2004/109839
[Patent Reference 3] Japanese Published Unexamined Patent Application No. 2004-319390
[Patent Reference 4] Japanese Published Unexamined Patent Application No. 2004-311429
[Non-patent Reference 1] Solid State Ionics, 113-115, p. 57

DISCLOSURE OF THE INVENTION

Problems to be Solved by the Invention

Nevertheless, the just-mentioned conventional techniques alone cannot sufficiently improve the cycle performance and the increase of the battery thickness due to charge-discharge cycling.

Accordingly, it is an object of the present invention to provide a lithium secondary battery that shows good cycle performance and at the same time achieves high energy density even with the use of silicon particles or the like as the negative electrode active material, and to provide a method of manufacturing such a battery.

Means for Solving the Problems

In order to accomplish the foregoing and other objects, the present invention provides a lithium secondary battery comprising: a negative electrode having a negative electrode current collector and a negative electrode active material layer disposed on the negative electrode current collector, the negative electrode active material layer containing negative electrode active material particles and a negative electrode binder, the negative electrode active material particles including silicon particles and/or silicon alloy particles (hereinafter also collectively referred to as silicon/silicon alloy particles) having a crystallite size of 100 nm or less; a positive electrode having a positive electrode active material; a separator; and a non-aqueous electrolyte.

The single crystal of the silicon/silicon alloy particles has a cleavage plane in the (111) plane, and therefore, the expansion and shrinkage of the negative electrode active material during the charge and discharge causes the particles to fracture along the cleavage plane. In the case of using silicon/silicon alloy particles having a large crystallite size (i.e., monocrystalline silicon particles), the particle tends to easily fracture along the cleavage plane all at once because the crystallites are oriented in the same directions. Moreover, since the size of the fracture tends to be large, the increase in the newly exposed surfaces that are produced in one charge-discharge cycle accordingly becomes large. As a result, the silicon/silicon alloy particles and the non-aqueous electrolyte react with each other in the newly exposed surfaces, causing the cycle performance of the battery to deteriorate, and the silicon/silicon alloy particles expand, causing the battery thickness to increase.

In contrast, in the case of using silicon/silicon alloy particles having a small crystallite size (i.e., polycrystalline silicon particles) as the negative electrode active material, the crystallites are oriented in random directions (i.e., the orientations of the crystallites are not aligned linearly, unlike the case of monocrystalline particles). Therefore, if a fracture occurs in a cleavage plane of one crystallite, the fracture does not easily propagate to other crystallites. This inhibits the newly exposed surfaces from increasing per one cycle of charge and discharge and therefore makes it possible to prevent the silicon/silicon alloy particles and the non-aqueous electrolyte from reacting with each other at the newly exposed surfaces. As a result, it becomes possible to suppress the cycle performance deterioration of the battery and the battery thickness increase resulting from the expansion of the silicon/silicon alloy particles. In particular, the just-mentioned advantageous effects are exerted more effectively by controlling the crystallite size of the silicon/silicon alloy particles to 100 nm or less.

In the silicon/silicon alloy particles of the present invention that have a crystallite size of 100 nm or less, a large number of crystallites exist in a particle because the crystallite size is small relative to the particle size. Therefore, the lithium tends to move easily into the active material particle during charge and discharge because of grain boundary diffusion of lithium, so the reaction uniformity in the particle is very high. When the reaction uniformity in the particle is low, a large strain occurs in the particle due to an increase in difference of the amounts of volumetric changes in the particle. Consequently, fractures of the particle are promoted. However, when the above-described restriction is made, the reaction uniformity becomes very high. Therefore, such fractures in the particles are prevented, and very good charge-discharge characteristics can be obtained.

In addition, when the silicon/silicon alloy particles have a crystallite size of 100 nm or less, there are a large number of crystallites in a particle, so the silicon/silicon alloy particles have very small surface irregularities. When the surfaces of the silicon/silicon alloy particles have such small irregularities, the negative electrode binder gets into such irregular portions, exerting an anchoring effect. Therefore, an advantageous effect is achieved that the adhesion of the silicon/silicon alloy particles with one another improves further.

It is desirable that the silicon particles and the silicon alloy particles have a crystallite size of 60 nm or less.

When the silicon/silicon alloy particles have a crystallite size of 60 nm or less, the fractures in the silicon/silicon alloy particles resulting from the charge-discharge operations are made even smaller. Therefore, it becomes possible to further prevent the increase of the contact area between the non-aqueous electrolyte and the newly exposed surfaces in the negative electrode active material. At the same time, the reaction uniformity becomes higher, and also, the anchoring effect becomes more significant.

It is desirable that the silicon particles and the silicon alloy particles have an average particle size of from 7 μm to 25 μm.

The Reason why the Average Particle Size of the Silicon/Silicon Alloy Particles is Controlled to be 7 μm or Greater When the average particle size of the silicon/silicon alloy particles is 7 μm or greater, the specific surface area of the silicon/silicon alloy particle is small originally (i.e., at the initial stage of the battery manufacture), and therefore, the contact area between the non-aqueous electrolyte and the newly exposed surfaces in the silicon/silicon alloy particles can be reduced. Therefore, the effect of improving the charge-discharge cycle performance and the effect of preventing the expansion of the silicon/silicon alloy particles can be exerted more effectively.

The Reason why the Average Particle Size of the Silicon/Silicon Alloy Particles is Controlled to be 25 μm or Less In the lithium secondary battery employing a carbon material such as graphite as the negative electrode active material, the thickness of the negative electrode active material layer formed on one side of the negative electrode current collector is approximately from 60 μm to 100 μm. When using a positive electrode similar to such a negative electrode active material using a carbon material (i.e., a positive electrode having the same thickness, in other words, a positive electrode having the same capacity) in a lithium secondary battery, it is desirable to control the thickness of the negative electrode active material layer to 40 μm or less per one side of the electrode in order to obtain a high capacity battery. Accordingly, it is necessary to control the particle size of the silicon/silicon alloy particles, which are used as the negative electrode active material particles according to the present invention, to be 40 μm or less. However, merely controlling the particle size of the silicon/silicon alloy particles to 40 μm or less is insufficient. If silicon particles with a particle size of 25 μm or greater are contained in the negative electrode active material in a large amount, defects such as streaks and scratches occur when coating the electrode. For this reason, it is preferable that the average particle size of the silicon/silicon alloy particles be controlled to 25 μm or less.

It is desirable that the silicon particles and the silicon alloy particles have a particle size distribution in which D10 is 3 μm or greater and D90 is 30 μm or less.

When the particle size distribution of the silicon/silicon alloy particles is controlled to be narrow in this way so that the particle sizes of the silicon/silicon alloy particles are uniform, the local degradation (expansion) of the silicon/silicon alloy particles can be prevented. Therefore, the effect of improving the charge-discharge cycle performance and the effect of preventing the expansion of the silicon/silicon alloy particles can be exerted more effectively.

It is desirable that the negative electrode active material particles be composed of the silicon particles, and the silicon particles be composed of silicon having a purity of 95 mass % or greater.

By using silicon particles as the negative electrode active material particles and controlling the silicon particles to have a purity of 95 mass % or greater, the amount of the silicon that is involved in charge and discharge increases. As a result, the capacity of the negative electrode can be increased.

It is desirable that the silicon particles contain oxygen and, as an impurity, at least one element selected from the group consisting of phosphorus, boron, aluminum, iron, calcium, sodium, gallium, lithium, and indium.

When at least one of the just-mentioned impurities is mixed in with the silicon, the electron conductivity of the silicon is improved. Therefore, the current collection performance within the negative electrode active material layer improves, and the uniformity of the electrode reaction becomes desirable. It should be noted that oxygen is included in addition to the impurities such as phosphorus because oxygen is unavoidably present therein because of the surface oxidation of silicon.

Among the above-listed impurities, phosphorus and boron are particularly preferable. Phosphorus and boron can form a solid solution with silicon if they are present in an amount of several hundred ppm. When a solid solution forms in this way, the electron conductivity in the negative electrode active material particles further improves. Such silicon in which phosphorus or boron is contained in the form of solid solution may be formed preferably by adding a phosphorus source or a boron source, such as phosphine ($PH_3$) or diborane ($B_2H_6$), in an appropriate amount, to a silane compound that is a source material of the thermal decomposition or the thermal reduction.

It should be noted that, as well as the silicon, a silicon alloy containing an impurity as listed above also exhibits the same advantageous effects as described above.

It is desirable that the silicon/silicon alloy particles be prepared by thermal decomposition or thermal reduction of a material containing a silane compound.

The reason why it is preferable to use the silicon/silicon alloy particles prepared by thermal decomposition or thermal reduction is that the use of such methods makes it easy to obtain silicon/silicon alloy particles having a crystallite size of 100 nm or less.

Herein, the term "thermal decomposition" refers to a method of depositing silicon by thermally decomposing a material containing a silane compound such as trichlorosilane ($SiHCl_3$), monosilane ($SiH_4$), and disilane ($Si_2H_6$). The term "thermal reduction" refers to a method of depositing silicon by thermally decomposing a material containing a silane compound such as trichlorosilane ($SiHCl_3$), monosilane ($SiH_4$), and disilane ($Si_2H_6$) under a reducing atmosphere.

It is desirable that the silicon particles be prepared by pulverizing an ingot of silicon that is prepared by thermally decomposing or thermally reducing a material containing a silane compound, and classifying the pulverized material. Likewise, it is desirable that the silicon alloy particles be prepared by pulverizing an ingot of a silicon alloy that is prepared by thermally decomposing or thermally reducing a material containing a silane compound, and classifying the pulverized material.

In the case that grain boundaries exist in a silicon ingot, mechanical pulverization of the ingot causes fractures along the grain boundaries. The silicon ingot prepared by thermal decomposition or thermal reduction, which has a small crystallite size, have a large number of grain boundaries. Therefore, if the silicon ingot is pulverized to an average particle size of 7 μm to 25 μm, which is preferable for the present invention, a large number of grain boundary surfaces appear at the particles' surface. As a consequence, the particle surface becomes extremely irregular. Thus, since the anchoring effect becomes more significant, the adhesion between the negative electrode active material particles improves remarkably, achieving extremely good charge-discharge characteristics. Furthermore, as will be described later, in the case that the binder is thermoplastic, the binder can enter the irregular surface portions of the silicon/silicon alloy particles more reliably (i.e., the binder can exhibit heat bonding effect more significant) by carrying out the heat treatment in the electrode preparation at a temperature above the thermoplastic temperature range of the binder. As a result, the charge-discharge performance improves dramatically.

It is desirable that the silane compound be monosilane ($SiH_4$).

In order to produce silicon/silicon alloy particles with a smaller crystallite size by thermal decomposition or thermal reduction, it is preferable that the temperature at which the silane compound is thermally decomposed be as low as possible. The reason is that the lower the temperature of the thermal decomposition is, the more likely the particles with a smaller crystallite size can be produced.

Here, when trichlorosilane ($SiHCl_3$) is used as the source material in the thermal decomposition or the thermal reduction, the minimum temperature necessary for the thermal decomposition at which the silicon/silicon alloy particles can be deposited appropriately is about 900° C. to 1000° C. When monosilane ($SiH_4$) is used, the minimum temperature is about 600° C. to 800° C., so the deposition of the silicon/silicon alloy particles is possible at a lower temperature. Therefore, it is preferable that in preparing silicon/silicon alloy particles having a small crystallite size suitable for the present invention, monosilane ($SiH_4$) be used as the source material.

Moreover, the silicon/silicon alloy particles obtained by thermal decomposition or thermal reduction using monosilane ($SiH_4$) as the source material has an additional advantage that it serves to improve the charge-discharge characteristics further because it has a large amount of remaining elemental hydrogen component.

It is desirable that the negative electrode active material layer contain 3 mass % to 20 mass %, based on the weight of the negative electrode active material, of graphite powder having an average particle size of from 3 μm to 15 μm.

When the negative electrode active material layer contains graphite powder, the electron conductivity in the negative electrode active material layer improves because a conductive network is formed in the negative electrode active material layer, and the uniformity of the reactions between the negative electrode active material particles (including the case in which two or more kinds of negative electrode active material particles are mixed together) improves. As a result, the uniformity of volumetric changes of the silicon/silicon alloy particles associated with the charge-discharge reactions improves. Therefore, the strain in the negative electrode active material layer that occurs due to charge-discharge operations is reduced, the fractures of the binder are prevented, and the charge-discharge characteristics are improved.

The average particle size of the graphite powder is restricted to be from 3 μm to 15 μm for the following reason.

If the average particle size of graphite powder is less than 3 μm, the total surface area of the graphite powder contained in the negative electrode active material layer is large, so the amount of the negative electrode binder that exists on the graphite powder surface is large while the amount of the negative electrode binder that exists on the negative electrode active material surface is correspondingly small. As a consequence, the binding effect of the negative electrode binder becomes poor, resulting in poor charge-discharge cycle performance. On the other hand, if the average particle size of the graphite powder exceeds 15 μm, the number of the graphite powder particles per weight is so small that a sufficient conductive network cannot be formed in the negative electrode active material layer, and the effect of improving reaction uniformity cannot be fully exhibited.

The amount of graphite powder with respect to the total amount of the negative electrode active material is restricted to be from 3 mass % to 20 mass % for the following reason.

If the amount of the graphite powder added is less than 3 mass %, the amount of the graphite powder is so small that a conductive network cannot be formed sufficiently in the negative electrode active material layer, and the effect of improving reaction uniformity cannot be fully exhibited. On the other hand, if the amount of the graphite powder added exceeds 20 mass %, the effect of the negative electrode binder for binding the negative electrode active material particles will become poor, and poor charge-discharge cycle performance will result, because the amount of the negative electrode binder that exists on the graphite powder surface is large while the amount of the negative electrode binder that exists on the surface of the negative electrode active material particle becomes correspondingly small.

It is desirable that the negative electrode active material layer have a thickness of 40 μm or less.

Controlling the thickness of the negative electrode active material layer to be 40 μm or less allows the battery to have a high capacity.

It is desirable that the negative electrode binder be thermoplastic.

In the case that the negative electrode binder is thermoplastic, the negative electrode binder can go into the irregularities in the surfaces of the silicon/silicon alloy particles more (i.e., the heat bonding effect of the negative electrode binder can become more significant) by carrying out the heat treatment in preparing the electrode at a temperature above the thermoplastic region of the negative electrode binder, and therefore, the adhesion improves still further. When the degree of adhesion in the negative electrode is higher, the current collection performance can be kept higher even if the silicon/silicon alloy particles undergo volumetric changes by charge and discharge. Accordingly, the uniformity of the reactions in the negative electrode improves, and the development of the expansion of the silicon/silicon alloy particles due to their deterioration is suppressed. As a result, the current collection structure in the negative electrode active material layer can be prevented from degrading. Therefore, the charge-discharge cycle performance improves.

It is desirable that the negative electrode current collector comprise a copper alloy, and the negative electrode binder have a melting point of or a glass transition temperature of from 150° C. to 450° C.

The Reason why it is Desirable that the Negative Electrode Binder have a Melting Point of or a Glass Transition Temperature of 150° C. or Higher It has been found that the thermal bonding effect of the binder is obtained more effectively when the heat treatment process on the electrode for thermal bonding of the binder is carried out as a post process separate from the drying process on the negative electrode active material slurry. In this case, the drying process on the negative electrode active material slurry is commonly performed at 20° C. to 150° C. For this reason, if the melting point or the glass transition temperature of the negative electrode binder is less than 150° C., the negative electrode binder will soften at the drying process, and the productivity will decrease. For this reason, it is preferable that the negative electrode binder have a melting point of or a glass transition temperature of 150° C. or higher.

The Reason why it is Desirable that the Negative Electrode Binder have a Melting Point of or a Glass Transition Temperature of 450° C. or Lower It is essential that the negative electrode current collector of the present invention have high mechanical strength for withstanding the deformation caused by the stress originating from the volumetric changes of the silicon negative electrode active material during charge and discharge. In addition, the negative electrode current collector needs to have high electron conductivity. For this reason, a copper alloy foil may suitably be used for the negative electrode current collector. In this case, however, it is desirable that the heat treatment in the electrode preparation be performed at 450° C. or lower because the copper alloy foil is annealed by high temperature and consequently its mechanical strength may decrease. Specifically, if the heat treatment on the electrode is performed at a temperature higher than 450° C., the strength of the copper alloy foil will reduce excessively by annealing. As a consequence, the copper alloy foil may undergo deformation as the silicon negative electrode active material undergoes volumetric changes because of charge-discharge operations, resulting in degradation in the adhesion strength between the negative electrode active material layer and the copper alloy foil interface, and poor charge-discharge performance may result. For this reason, it is necessary that the negative electrode binder have a melting point of or a glass transition temperature of 450° C. or lower, in order to obtain thermal bonding effect of the binder without causing deformation of the negative electrode current collector.

It is desirable that the negative electrode binder be composed of a polyimide.

The use of a polyimide as the negative electrode binder serves to increase the strength of the binder itself, and in addition, serves to improve the adhesion of the negative electrode active material particles with one another and the adhesion between the negative electrode active material particles and the negative electrode current collector. As a result, even when the negative electrode active material expands and shrinks during charge and discharge, the current collection structure in the negative electrode active material layer can be prevented from degrading. Therefore, the uniformity of the reactions in the negative electrode improves.

It is desirable that the positive electrode active material contain a lithium-transition metal composite oxide, and that the theoretical electrical capacity ratio of the positive electrode to the negative electrode be 1.2 or less.

Restricting the theoretical electrical capacity ratio of the positive electrode to the negative electrode to 1.2 or less, as in the just-described configuration, means a smaller amount of lithium that can be charged and discharged per 1 atom of silicon, making it possible to reduce the amount of change in volume per each one of the silicon/silicon alloy particles. As a result, the fracture of the silicon/silicon alloy particles caused by charge and discharge cycling becomes smaller, so it becomes possible to further prevent the increase of the contact area between the non-aqueous electrolyte and the newly exposed surfaces in the silicon/silicon alloy particles.

Furthermore, allowing the positive electrode active material to contain a lithium-transition metal composite oxide can increase the battery capacity and improve the cycle performance. It is particularly preferable to use a positive electrode active material represented by the chemical formula $Li_aNi_xMn_yCo_zO_2$ (wherein $0 \leq a \leq 1$, $x+y+z=1$, $0 \leq x \leq 1$, $0 \leq y \leq 1$, and $0 \leq z \leq 1$) as the lithium-transition metal composite oxide.

It is desirable that the non-aqueous electrolyte contain $CO_2$ and/or fluoroethylene carbonate.

$CO_2$ and carbonates containing fluorine (such as fluoroethylene carbonate) have the effect of allowing the reactions on the surface of the silicon/silicon alloy particles with lithium to take place smoothly and therefore serve to improve the uniformity of the reactions in the negative electrode. Thus, the expansion of the silicon/silicon alloy particles is suppressed, and as a result, the cycle performance is improved.

The present invention also provides a method of manufacturing a lithium secondary battery comprising: preparing silicon particles having a crystallite size of 100 nm or less and/or silicon alloy particles having a crystallite size of 100 nm or less; preparing a negative electrode by applying a negative electrode active material paste comprising a negative electrode binder and negative electrode active material particles including the silicon particles and/or the silicon alloy particles onto a surface of a negative electrode current collector, thereafter drying the negative electrode mixture slurry with the current collector, and pressure-rolling the negative electrode mixture with the current collector; and disposing the negative electrode, a positive electrode, and a separator so that the separator is interposed between the negative electrode and the positive electrode, and supplying a non-aqueous electrolyte to the positive and negative electrodes and the separator.

The above-described lithium secondary battery may be manufactured by the just-described method.

It is preferable that, in the step of preparing the negative electrode, a heat treatment is performed under a non-oxidizing atmosphere after the drying and pressure-rolling is performed.

The heat treatment causes the contact area of the binder with the negative electrode active material particles and the negative electrode current collector to increase, and chemical reactions to take place, improving the adhesion of the negative electrode active material particles with one another and the adhesion between the negative electrode active material particles and the current collector. This can prevent the breakage of the current collection structure in the negative electrode active material layer because of the expansion and shrinkage of the negative electrode active material associated with charge and discharge cycling, and therefore, even when charge and discharge operations are performed repeatedly, the uniformity of the electrode reactions can be maintained. In order to obtain this advantageous effect more evidently, it is preferable that the heat treatment be performed at a temperature of 200° C. or higher.

It should be noted that the non-oxidizing atmosphere refers to an inert gas atmosphere such as an argon gas atmosphere, a vacuum atmosphere, and the like.

It is desirable that the heat treatment be conducted at a temperature higher than the melting point or the glass transition temperature of the negative electrode binder.

When the heat treatment is conducted at a temperature higher than the melting point or the glass transition temperature of the negative electrode binder, the negative electrode binder is put in the thermoplastic region. Thus, the negative electrode binder gets into the surface irregularities of the negative electrode active material particles to a greater degree (the anchoring effect is exhibited more significantly), and a greater level of adhesion strength can be obtained.

It is desirable that, when the negative electrode current collector comprises a copper alloy, and the temperature of the heat treatment be from 150° C. to 450° C.

The reason is the same as that discussed above.

It is desirable that the silicon/silicon alloy particles be prepared by a gas phase method.

Preparing the silicon/silicon alloy particles by a gas phase method makes it possible to prepare silicon particles with a small crystallite size, because the phase change from a gas phase into a solid phase is very fast in the gas phase method.

It is desirable that the silicon particles be prepared by pulverizing and classifying an ingot of silicon prepared by the gas phase method. It is also desirable that the silicon alloy particles be prepared by pulverizing and classifying an ingot of a silicon alloy prepared by the gas phase method.

In the case that the silicon/silicon alloy particles are prepared by a gas phase method as well, mechanical pulverization of the ingot of silicon or the like results in fractures along the grain boundaries when grain boundaries exist in the silicon ingot or the like. As a result, a large number of grain boundary surfaces appear in the surface of the particle, so the anchoring effect becomes more significant. Therefore, the adhesion between the negative electrode active material particles improves remarkably.

It is desirable that the silicon particles and the silicon alloy particles be prepared by thermal decomposition or thermal reduction.

When the silicon/silicon alloy particles are prepared by a thermal reduction method, polycrystalline silicon particles with a high purity can be easily fabricated. Moreover, it is possible to fabricate polycrystalline silicon particles containing a trace amount of impurity by flowing a dopant gas containing a phosphorus compound, a boron compound, or the like during the thermal reduction.

It is desirable that the silicon particles be prepared by pulverizing an ingot of silicon prepared by the thermal decomposition or the thermal reduction and classifying the pulverized material. It is also desirable that the silicon alloy particles be prepared by pulverizing an ingot of a silicon alloy prepared by the thermal decomposition or the thermal reduction and classifying the pulverized material. Moreover, it is desirable that a source material in the thermal decomposition or the thermal reduction be a silane compound. Furthermore, it is desirable that the silane compound be monosilane ($SiH_4$).

The reasons are the same as described above.

Advantages of the Invention

The present invention makes available a lithium secondary battery that shows good cycle performance and also prevents the increase in the battery thickness due to charge-discharge cycling, and a method of manufacturing such a battery.

BEST MODE FOR CARRYING OUT THE INVENTION

Hereinbelow, the present invention is described in further detail based on certain embodiments and examples thereof. It should be construed, however, that the present invention is not limited to the following embodiments and examples, but various changes and modifications are possible without departing from the scope of the invention.

[Preparation of Negative Electrode]

First, a polycrystalline silicon ingot was prepared by thermal reduction. Specifically, a plurality of silicon seeds (diameter: about 8 mm) placed in a metal reactor (reducing furnace) is heated to 1000° C. by passing an electric current therethrough, and a mixed gas of hydrogen and a vapor of high-purity trichlorosilane ($SiHCl_3$) is flowed therethrough to deposit silicon on the silicon seeds, whereby a polycrystalline silicon ingot was formed into a thick rod shape.

Next, the polycrystalline silicon ingot was pulverized and classified, so that polycrystalline silicon particles (negative electrode active material particles) having a purity of 99% were prepared. The polycrystalline silicon particles thus prepared had a crystallite size of 58 nm and an average particle size of 15 µm, and the particle size distribution thereof was as follows; D10 was 8 µm, D50 was 15 µm, and D90 was 23 µm. The methods for calculating the crystallite size, the average particle size, and the particle size distribution are detailed below.

Method for Calculating Crystallite Size

The crystallite size was calculated from the half-width of silicon (111) peak (2θ=about 28.4°) measured by a powder X-ray diffraction analysis using Scherrer's formula shown below.

$$D_{hkl}=k\lambda/\beta \cos \theta \qquad (1)$$

Here, $D_{hkl}$ is the crystal size viewed from the (hkl) plane, k is the constant of proportionality, λ is the wavelength of the X-ray radiation, β is the half-width of the diffraction peak, and θ is the angle of diffraction.

Method for Calculating Average Particle Size and Particle Size Distribution

The average particle size and the particle size distributions (D10, D50, and D90) were determined through a particle size distribution measurement using a laser diffraction particle size analyzer.

The specific calculation method of the particle size distribution was as follows; cumulative masses of the particles were obtained sequentially in an ascending order from those with smaller particle sizes so as to obtain a particle size at which the added amount reached X % of the total amount of the particles. The particle diameter obtained when the value X is 10 is expressed as D10, the particle diameter obtained when the value X is 50 is expressed as D50, and the particle diameter obtained when the value X is 90 is expressed as D90.

Next, the just-described negative electrode active material particles were mixed with a precursor of a polyimide resin (the resin represented by the following chemical formula (1), hereinafter also referred to as a "polyimide resin A"), which was a polyamic acid varnish (the varnish represented by the following chemical formula (2), in which the solvent was NMP and the concentration was 18 mass %, based the amount of the polyimide resin A after imidization by the heat treatment for the negative electrode active material) together with N-methyl-2-pyrrolidone as a dispersion medium so that the mass ratio of the negative electrode active material particles and the polyimide resin A after imidization became 90:10. Thus, a negative electrode active material slurry was obtained.

Thereafter, this negative electrode active material slurry was applied onto both sides of a negative electrode current collector made of a 18 μm-thick copper alloy foil (C7025 alloy foil, which contains 96.2 mass % of copper, 3 mass % of nickel, 0.65 mass % of silicon, and 0.15 mass % of magnesium) that had been subjected to a roughening process so as to have a surface roughness Ra (defined by Japanese Industrial Standard (JIS) B 0601-1994) of 0.25 μm and a mean spacing of local peaks S (also defined by JIS B 0601-1994) of 0.85 μm. The coating was performed in the air at 25° C. Thereafter, the negative electrode current collector coated with the negative electrode active material slurry was dried in the air at 120° C. and then pressure-rolled in the air at 25° C. The resultant article was cut out into a 390 mm×52 mm rectangle shape, and thereafter subjected to a heat treatment at 400° C. for 10 hours under an argon atmosphere, to thus prepare a negative electrode in which a negative electrode active material layer was formed on the surfaces of the negative electrode current collector. The amount of the negative electrode active material layer was 5.6 mg/cm², and the thickness of each side of the negative electrode active material layer was 18 μm.

Definition of Mean Spacing of Local Peaks S

Mean spacing of local peaks S refers to the mean value of the spacings between sets of peaks and valleys adjacent to each other in a cross-sectional profile curve as illustrated in FIG. 5, expressed by the following equation (2), wherein the respective spacings of sets of adjacent peaks and valleys are denoted as S1, S2, . . . , and Sn.

$$S = \frac{1}{n}\sum_{i=1}^{n} Si \qquad \text{Eq. (2)}$$

[Preparation of Positive Electrode]

First, LiCoO₂ powder as a positive electrode active material, carbon material powder as a conductive agent, and polyvinylidene fluoride as a binder were added to N-methyl-2-pyrrolidone as a dispersion medium so that the weight ratio of the active material, the conductive agent, and the binder became 94:3:3, and the mixture was kneaded to prepare a positive electrode active material slurry.

Next, the resultant positive electrode active material slurry was applied onto both sides of a positive electrode current collector made of an aluminum foil with a thickness of 15 μm, a length of 377 mm, and a width of 50 mm so that the applied area on the obverse side has a length of 340 mm and a width of 50 mm and the applied area on the reverse side has a length of 270 mm and a width of 50 mm. Thereafter, the positive electrode current collector coated with the positive electrode active material was dried and pressure-rolled, to thus prepare a positive electrode. The amount of the positive electrode active material layer on the positive electrode current collector was 53 mg/cm².

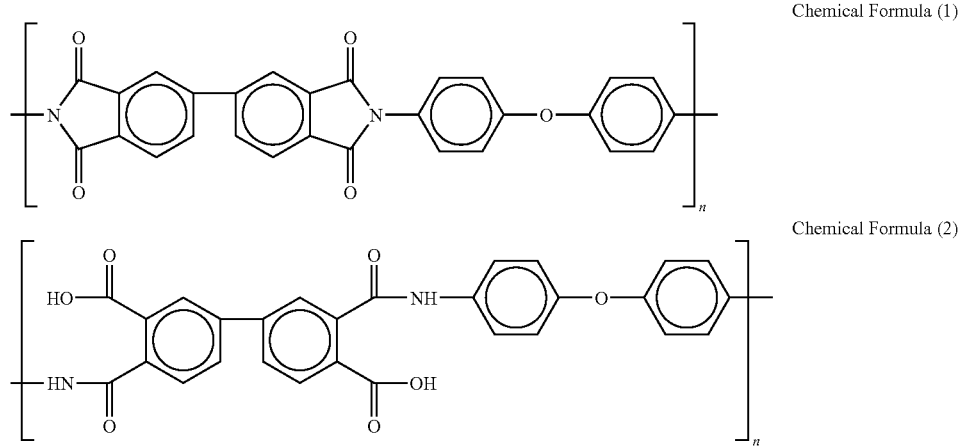

Chemical Formula (1)

Chemical Formula (2)

Definition of Surface Roughness Ra

Surface Roughness Ra refers to the mean value of the absolute values of the heights of a roughness curve as illustrated in FIG. 4, expressed by the following equation (1), wherein the roughness curve is y=f(x) and L is the length of the roughness curve.

$$Ra = \frac{1}{L}\int_{0}^{L} |f(x)|dx \qquad \text{Eq. (1)}$$

[Preparation of Non-aqueous Electrolyte]

Lithium hexafluorophosphate (LiPF₆) was dissolved at a concentration of 1.0 mole/L in a mixed solvent of 3:7 volume ratio of ethylene carbonate (EC) and diethyl carbonate (DEC), and thereafter, 0.4 mass % of carbon dioxide gas was added thereto, to thus prepare a non-aqueous electrolyte solution.

[Construction of Battery]

First, the positive electrode and the negative electrode prepared as described above were wound in a cylindrical form with a porous polyethylene separator interposed therebetween. Next, the cylindrical wound electrode assembly was pressed into a flat shape, and thereafter the flat-shaped electrode assembly and the non-aqueous electrolyte solution were accommodated into a battery case made of aluminum laminate under an argon atmosphere at room temperature and atmospheric pressure. Thus, a lithium secondary battery was prepared.

The specific structure of the lithium secondary battery is as follows. As illustrated in FIGS. 1 and 2, a positive electrode 1 and a negative electrode 2 are disposed so as to oppose each other across a separator 3, whereby a power-generating element is constituted by the positive electrode 1, the negative electrode 2, the separator 3, and the non-aqueous electrolyte solution. The positive electrode 1 and the negative electrode 2 are connected to a positive electrode current collector tab 4 and a negative electrode current collector tab 5, respectively, forming a structure that enables charging and discharging as a secondary battery. The power-generating element made of the positive electrode 1, the negative electrode 2, and the separator 3 is disposed in a space of an aluminum laminate battery case 6 having a sealed part 7, at which opposing peripheral ends of the aluminum laminate are heat sealed.

EXAMPLES

First Group of Examples

In the First Group of Examples, a study was conducted about how the crystallite size and average particle size of the negative electrode active material affects the battery performance.

Example 1

A battery prepared in the manner described in the previous section, Best Mode for Carrying Out the Invention, was used for Example 1.

The battery fabricated in this manner is hereinafter referred to as Battery A1 of the invention.

Example 2

A battery was fabricated in the same manner as described in Example 1 above, except that the polycrystalline silicon particles used had a crystallite size of 58 nm, an average particle size of 10 μm, and a particle size distribution in which D10 was 5 μm, D50 was 10 μm, and D90 was 16 μm. The crystallite size, the average particle size, and the particle size distribution were measured in the same manner as described in the previous section, Best Mode for Carrying Out the Invention. It should be noted that the same measurement method was also used in the following Examples 3 and 4 as well.

The battery fabricated in this manner is hereinafter referred to as Battery A2 of the invention.

Example 3

A battery was fabricated in the same manner as described in Example 1 above, except that the polycrystalline silicon particles used had a crystallite size of 58 nm and an average particle size of 2.5 μm, and a particle size distribution in which D10 was 1.0 μm, D50 was 2.5 μm, and D90 was 6.0 μm.

The battery fabricated in this manner is hereinafter referred to as Battery A3 of the invention.

Example 4

A battery was fabricated in the same manner as described in Example 1 above, except that the polycrystalline silicon particles used had a crystallite size of 58 nm, an average particle size of 0.3 μm, and a particle size distribution in which D10 was 0.1 μm, D50 was 0.3 μm and D90 was 0.9 μm.

The battery fabricated in this manner is hereinafter referred to as Battery A4 of the invention.

Comparative Example 1

A battery was fabricated in the same manner as in Example A1 above, except that metallic silicon particles (purity: 99%) were used as the negative electrode active material particles, in place of the polycrystalline silicon particles. The metallic silicon particles had a crystallite size of $15 \times 10^3$ nm, an average particle size of 15 μm, and a particle size distribution in which D10 was 8 μm, D50 was 15 μm, and D90 was 23 μm. The crystallite size was determined as the same size as the particle size because when metallic silicon with a purity 99% was pulverized and classified to have an average particle size of 50 μm, the resultant powder had a crystallite size of 50 μm. The same applies to Comparative Examples 2 to 4 below.

The battery fabricated in this manner is hereinafter referred to as Comparative Battery Z1.

Comparative Example 2

A battery was fabricated in the same manner as described in Comparative Example Z1 above, except that the metallic silicon particles used as the negative electrode active material particles had a crystallite size of $10 \times 10^3$ nm, an average particle size of 10 μm, and a particle size distribution in which D10 was 6 μm, D50 was 10 μm, and D90 was 15 μm.

The battery fabricated in this manner is hereinafter referred to as Comparative Battery Z2.

Comparative Example 3

A battery was fabricated in the same manner as described in Comparative Example Z1 above, except that the metallic silicon particles used as the negative electrode active material particles had a crystallite size of $2.5 \times 10^3$ nm, an average particle size of 2.5 μm, and a particle size distribution in which D10 was 0.5 μm, D50 was 2.5 μm, and D90 was 6.0 μm.

The battery fabricated in this manner is hereinafter referred to as Comparative Battery Z3.

Comparative Example 4

A battery was fabricated in the same manner as described in Comparative Example Z1 above, except that the metallic silicon particles used as the negative electrode active material particles had a crystallite size of $0.3 \times 10^3$ nm, an average particle size of 0.3 μm, and a particle size distribution in which D10 was 0.1 μm, D50 was 0.3 μm, and D90 was 0.8 μm.

The battery fabricated in this manner is hereinafter referred to as Comparative Battery Z4.

(Experiment 1)

The charge-discharge cycle performance of each of Batteries A1 to A4 and Comparative Batteries Z1 to Z4 was evaluated. The results are shown in Table 1 and FIG. 3. The cycle life shown in Table 1 and FIG. 3 is the number of cycles at which the capacity retention ratio (a value obtained by dividing the discharge capacity at the n-th cycle by the discharge capacity at the first cycle) of the battery is 50%, and the greater the number, the better the performance.

[Charge-Discharge Conditions]

Charge Conditions for the First Cycle

Each of the batteries was charged at a constant current of 50 mA for 4 hours, thereafter charged at a constant current of 200 mA until the battery voltage reached 4.2 V, and further charged at a constant voltage of 4.2 V until the current value reached 50 mA.

Discharge Conditions for the First Cycle

Each of the batteries was discharged at a constant current of 200 mA until the battery voltage reached 2.75 V.

Charge Conditions for the Second Cycle Onward

Each of the batteries was charged at a constant current of 1000 mA until the battery voltage reached 4.2 V and thereafter charged at a constant voltage of 4.2 V until the current value reached 50 mA.

Discharge Conditions for the Second Cycle Onward

Each of the batteries was discharged at a constant current of 1000 mA until the battery voltage reached 2.75 V.

TABLE 1

| Battery | Negative electrode active material Material | Crystallite size (nm) | Average particle size (μm) | Particle size distribution D10 | D50 | D90 | Cycle life (times) |
|---|---|---|---|---|---|---|---|
| A1 | Polycrystalline Si | 58 | 15 | 8.0 | 15.0 | 23.0 | 450 |
| Z1 | Metallic Si | $15 \times 10^3$ | | 8.0 | 15.0 | 23.0 | 249 |
| A2 | Polycrystalline Si | 58 | 10 | 5.0 | 10.0 | 16.0 | 320 |
| Z2 | Metallic Si | $10 \times 10^3$ | | 6.0 | 10.0 | 15.0 | 175 |
| A3 | Polycrystalline Si | 58 | 2.5 | 1.0 | 2.5 | 6.0 | 142 |
| Z3 | Metallic Si | $2.5 \times 10^3$ | | 0.5 | 2.5 | 6.0 | 130 |
| A4 | Polycrystalline Si | 58 | 0.3 | 0.1 | 0.3 | 0.9 | 90 |
| Z4 | Metallic Si | $0.3 \times 10^3$ | | 0.1 | 0.3 | 0.8 | 84 |

The results shown in Table 1 and FIG. 3 clearly demonstrate that, when comparing the batteries that employ silicon particles with the same particle size with each other (for example, when comparing Battery A1 of the invention with Comparative Battery Z1), Batteries A1 to A4 of the invention, which employ polycrystalline silicon particles as the negative electrode active material particles, exhibit longer cycle life times than Comparative Batteries Z1 to Z4, which employ metallic silicon particles (monocrystalline silicon particles). This is believed to be due to the following reason.

In Comparative Batteries Z1 to Z4 that employ monocrystalline silicon particles, the particle easily fractures along the cleavage plane all at once because the crystallites are oriented in the same directions, and moreover, the area of the newly exposed surfaces produced in one charge-discharge cycle tends to be large. As a result, the negative electrode active material and the non-aqueous electrolyte react with each other in the newly exposed surfaces, resulting in the deterioration in the cycle performance of the battery.

In contrast, in Batteries A1 to A4 of the invention, which employ polycrystalline silicon particles, the crystallites are oriented in random directions. Therefore, even if a fracture occurs in a cleavage plane of one crystallite, the fracture does not easily propagate to other crystallites. Thus, the increase of the newly exposed surfaces in one charge-discharge cycle is prevented. As a result, the reaction between the negative electrode active material and the non-aqueous electrolyte in the newly exposed surfaces is prevented, and therefore, the deterioration in the cycle performance of the battery is prevented.

The results also show that Batteries A3 and A4 of the invention, in which the average particle diameter of the silicon particles is smaller, exhibit shorter cycle life time than Batteries A1 and A2 of the invention, in which the average particle diameter of the silicon particles is larger. In view of this, a study was conducted about average particle size of silicon particles. As a result, it was found that in order to achieve a longer cycle life time than that of Comparative Battery Z1, which showed the longest cycle life among Comparative Batteries Z1 to Z4, it is necessary to control the average particle size of silicon particles to be 7 μm or greater, as clearly seen from FIG. 3. Accordingly, it is desirable that the average particle size of the silicon particles be 7 μm or greater.

(Experiment 2)

Battery A1 of the invention and Comparative Battery Z1 were cycled 300 times and then disassembled. Each of the negative electrodes thereof was cut using an Ar ion beam, and the cross-sectional surface was observed with SEM. The results are shown in FIG. 6 (Battery A1 of the invention, 500 times magnification) and FIG. 7 (Comparative Battery Z1, 300 times magnification). In FIGS. 6 and 7, reference numeral 11 indicates a negative electrode current collector, and reference numeral 12 indicates a negative electrode active material layer.

The thickness of the negative electrode active material layer 12 in each of FIGS. 6 and 7 was measured. The thickness of the negative electrode active material layer 12 of Battery A1 of the invention, which used silicon particles with a smaller crystallite size, was 38 μm, whereas the thickness of the negative electrode active material layer 12 of Comparative Battery Z1, which used silicon particles with a larger crystallite size, was 86 μm. This indicates that the swelling of the negative electrode active material layer 12 was greater in Comparative Battery Z1 than in Battery A1 of the invention. Moreover, when comparing the negative electrode active material layer 12 between Battery A1 of the invention with that of Comparative Battery Z1, it is evident that Battery A1 of the invention shows less degradation of the negative electrode active material itself than Comparative Battery Z1.

As will be clearly understood from the above discussion, the present invention can prevent the increase in the negative electrode thickness after charge-discharge cycling and accordingly makes it possible to prevent the battery thickness increase.

(Experiment 3)

The physical properties (imidization ratio and glass transition temperature) of the binder resin A were measured.

For the measurement, the precursor of the polyimide resin A, polyamic acid varnish, alone was dried in the air at 120° C., as in the conditions for preparing the negative electrode, and was thereafter heat-treated under an argon atmosphere at 400° C. for 10 hours, to thereby prepare a block of binder resin A.

The imidization ratio was determined by IR spectroscopy, and it was found that no peak due to acid amide sites was observed with the block of the heat-treated binder resin A and that the imidization ratio was 100%.

The glass transition temperature as determined by a DSC (differential scanning calorimetry) measurement was 285° C.

Second Group of Examples

In the Second Group of Examples, a study was conducted about how the positive/negative electrode theoretical electrical capacity ratio affects the battery performance.

Example 1

A battery was fabricated in the same manner as described in Example 1 of the First Group of Examples, except that the amount of the negative electrode active material layer on the negative electrode current collector was controlled to be 6.4 mg/cm$^2$.

The battery fabricated in this manner is hereinafter referred to as Battery B1 of the invention.

Example 2

A battery was fabricated in the same manner as described in Example 1 of the First Group of Examples, except that the amount of the negative electrode active material layer on the negative electrode current collector was controlled to be 3.4 mg/cm$^2$.

The battery fabricated in this manner is hereinafter referred to as Battery B2 of the invention.

(Experiment)

Theoretical electrical capacity ratio of the positive electrode to the negative electrode was determined for each of Batteries B1 and B2 as well as Battery A1, according to the invention, using the following equation (3). The batteries were also charged and discharged under the same charge-discharge conditions set out in Experiment 1 described in the First Group of Examples, to obtain the initial charge-discharge efficiency, determined by the following equation (4), and the cycle life. The results are shown in Table 2 below.

In calculating the theoretical electrical capacity ratio between the positive and negative electrodes, the theoretical electrical capacity of the negative electrode active material (silicon powder) was determined to be 4195 mAh/g, and the theoretical electrical capacity of the positive electrode active material (LiCoO$_2$) was determined to be 273.8 mAh/g.

Positive/negative electrode theoretical electrical capacity ratio=mass (g/cm$^2$) of positive electrode active material per unit area×theoretical electrical capacity (mAh/g) of positive electrode active material/mass (g/cm$^2$) of negative electrode active material per unit area×theoretical electrical capacity (mAh/g) of negative electrode active material    Eq. (3)

Initial charge-discharge efficiency=Discharge capacity (mAh) at the first cycle/Charge capacity (mAh) at the first cycle×100    Eq. (4)

TABLE 2

| Battery | Amount of negative electrode active material layer (mg/cm$^2$) | Amount of positive electrode active material layer (mg/cm$^2$) | Positive/negative electrode theoretical electrical capacity ratio | Initial charge-discharge efficiency (%) | Cycle life (times) |
|---|---|---|---|---|---|
| B1 | 6.4 | 53 | 0.56 | 83 | 472 |
| A1 | 5.6 | | 0.65 | 85 | 450 |
| B2 | 3.4 | | 1.06 | 87 | 346 |

As clearly seen from Table 2, Batteries B1 and B2 as well as A1 of the invention, in which the theoretical electrical capacity ratios of the positive electrode to the negative electrode are 1.20 or less, exhibit high initial charge-discharge efficiencies and long cycle life. However, Battery B2 of the invention, in which the theoretical electrical capacity ratio of the positive electrode to the negative electrode is 1.06, shows a shorter cycle life time than those of Batteries B1 and A1 of the invention, in which the theoretical electrical capacity ratios of the positive electrode to the negative electrode are 0.56 and 0.65, respectively. This suggests that increasing the theoretical electrical capacity ratio of the positive electrode to the negative electrode leads to a shorter cycle life time. Therefore, it is desirable that the theoretical electrical capacity ratio of the positive electrode to the negative electrode be 1.2 or less.

Third Group of Examples

In the Third Group of Examples, a study was conducted about how the differences of the kinds of silane compounds used as the source material for the polycrystalline silicon affect the battery performance.

Example

A battery was fabricated in the same manner as described in Example 1 of the First Group of Examples, except that polycrystalline silicon particles prepared according to the following method were used as the negative electrode active material.

First, a polycrystalline silicon ingot was prepared by thermal reduction. Specifically, silicon seeds placed in a metal reactor (reducing furnace) were heated to 800° C., and a mixed gas of purified hydrogen and a gas of high-purity monosilane (SiH$_4$) was flowed therein. Thus, polycrystalline silicon was deposited on the surfaces of the silicon seeds. Thereby, a polycrystalline silicon ingot was formed into a thick rod shape.

Next, the polycrystalline silicon ingot was pulverized and classified, so that polycrystalline silicon particles (negative electrode active material) having a purity of 99% were prepared. The polycrystalline silicon particles thus prepared had a crystallite size of 32 nm and an average particle size of 15 μm, and the particle size distribution thereof was as follows; D10 was 8 μm, D50 was 15 μm, and D90 was 23 μm.

The battery fabricated in this manner is hereinafter referred to as Battery C of the invention.

(Experiment)

The just-mentioned Battery C of the invention was charged and discharged under the same conditions as described in the foregoing experiment of the First Group of Examples, to determine the cycle life of the battery. The results are shown in Table 3 below. Table 3 also shows the cycle life of Battery A1 of the invention.

TABLE 3

| | Negative electrode active material | | | |
|---|---|---|---|---|
| Battery | Source gas of polycrystalline silicon | Manufacture temperature of polycrystalline silicon | Crystallite size | Cycle life (times) |
| C | Monosilane (SiH$_4$) | 800 | 32 | 624 |
| A1 | Trichlorosilane (SiHCl$_3$) | 1000 | 58 | 450 |

The results shown in Table 3 also clearly demonstrate that Battery C of the invention, which employed monosilane ($SiH_4$) as the source material for preparing the polycrystalline silicon, exhibited better cycle performance than Battery A1 of the invention, which employed trichlorosilane ($SiHCl_3$) as the source material.

The reaction temperature for depositing the polycrystalline silicon ingot is lower when monosilane ($SiH_4$) is used as the source material for preparing the polycrystalline silicon than when trichlorosilane ($SiHCl_3$) is used as the source material for preparing the polycrystalline silicon. Therefore, a polycrystalline silicon ingot with a smaller crystallite size was obtained when monosilane ($SiH_4$) was used as the source material for preparing the polycrystalline silicon. Since the polycrystalline silicon particles with a smaller crystallite size have more grain boundaries within each one crystallite and more disordered crystallite orientations, they are less prone to fractures in the silicon particle during charge and discharge. For these reasons, it is believed that Battery C of the invention, employing monosilane ($SiH_4$) as the source material for the polycrystalline silicon, was able to obtain excellent cycle performance.

Fourth Group of Examples

In the Fourth Group of Examples, a study was conducted about how addition of a conductive agent to the interior of the negative electrode active material layer affects the battery performance.

Example 1

A battery was fabricated in the same manner as described in Example 1 of the First Group of Examples, except that, when preparing the negative electrode active material slurry, graphite powder (average particle size: 1 μm) as the negative electrode conductive agent was added in an amount of 3 mass % with respect to the negative electrode active material.

The battery fabricated in this manner is hereinafter referred to as Battery D1 of the invention.

Examples 2 to 10

Batteries were fabricated in the same manner as described in Example 1 above, except that the average particle sizes and the amounts (mass ratios relative to the negative electrode active material particles) of the graphite powders added were as set forth in Table 4 blow.

The batteries fabricated in these manners are hereinafter referred to as Batteries D2 to D10 of the invention, respectively.

(Experiment)

The just-mentioned Batteries D1 to D10 of the invention were charged and discharged under the same conditions as described in the foregoing experiment of the First Group of Examples, to determine the cycle life for each battery. The results are shown in Table 4 below. Table 4 also shows the cycle life of Battery A1 of the invention.

TABLE 4

| Battery | Negative electrode conductive agent | | Cycle life (times) |
| --- | --- | --- | --- |
| | Average particle size (μm) | Amount added (mass %) | |
| D1 | 1 | 3 | 433 |
| D2 | 3.5 | | 502 |
| D3 | 5 | | 494 |
| D4 | 10 | | 489 |
| D5 | 15 | | 477 |
| D6 | 20 | | 441 |
| D7 | 3.5 | 1 | 448 |
| D8 | | 10 | 463 |
| D9 | | 20 | 456 |
| D10 | | 25 | 395 |
| A1 | — | — | 450 |

The results shown in Table 4 clearly demonstrate that Batteries D2 to D5, D8, and D9 of the invention, which contained graphite powder as the negative electrode conductive agent having an average particle size of from 3 μm to 15 μm in an amount of from 3 mass % to 20 mass %, exhibited better cycle performance than Batteries D1, D6, D7, and D10 of the invention, in which the average particle sizes and the amounts of the graphite powder were outside the just-mentioned ranges.

It is believed that adding graphite powder as the negative electrode conductive agent within the just-mentioned ranges prevented the adhesion within the negative electrode active material layer from deteriorating considerably, and permitted the graphite powder to form a conductive network. Therefore, the electron conductivity within the negative electrode active material layer was improved, and as a result, excellent charge-discharge characteristics were obtained.

Fifth Group of Examples

In the Fifth Group of Examples, a study was conducted about how the kinds of non-aqueous electrolyte solutions affect the battery performance.

Example 1

A battery was fabricated in the same manner as described in Example 1 of the First Group of Examples, except that no carbon dioxide gas ($CO_2$) was added when preparing the non-aqueous electrolyte solution.

The battery fabricated in this manner is hereinafter referred to as Battery E1 of the invention.

Example 2

A battery was fabricated in the same manner as described in Example 1 above, except that, when preparing the non-aqueous electrolyte solution, no carbon dioxide gas ($CO_2$) was added, and fluoroethylene carbonate was added to the mixed solution of ethylene carbonate (EC)/diethyl carbonate (DEC) containing lithium hexafluorophosphate in an amount of 10 mass % with respect to the mixed solution.

The battery fabricated in this manner is hereinafter referred to as Battery E2 of the invention.

Example 3

A battery was fabricated in the same manner as described in Example 1 above, except that, when preparing the non-aqueous electrolyte solution, fluoroethylene carbonate was added to the mixed solution of ethylene carbonate (EC)/diethyl carbonate (DEC) containing lithium hexafluorophosphate in an amount of 10 mass % with respect to the mixed solution, before carbon dioxide gas ($CO_2$) was added.

The battery fabricated in this manner is hereinafter referred to as Battery E3 of the invention.

(Experiment)

The just-mentioned Batteries E1 to E3 of the invention were charged and discharged under the same conditions as described in the foregoing experiment of the First Group of Examples, to determine the cycle life for each of the batteries. The results are shown in Table 5 below. Table 5 also shows the cycle life of Battery A1 of the invention.

TABLE 5

| Battery | Composition of non-aqueous electrolyte solution | | | Cycle life (times) |
|---|---|---|---|---|
| | Solvent (ratio) | Electrolyte (Amount added) | Additive | |
| E1 | EC/DEC (3/7) | LiPF$_6$ (1 M) | None | 413 |
| A1 | | | $CO_2$ (0.4 mass %) | 450 |
| E2 | | | FEC (10 mass %) | 554 |
| E3 | | | FEC (10 mass %) + $CO_2$ (0.4 mass %) | 567 |

The results shown in Table 5 clearly demonstrate that Batteries A1, E2, and E3 of the invention, in which the non-aqueous electrolyte solution contained carbon dioxide gas ($CO_2$) and fluoroethylene carbonate, exhibited better cycle performance than Battery E1 of the invention, in which the non-aqueous electrolyte solution contained neither of them.

The reason is believed to be as follows. When carbon dioxide gas or fluoroethylene carbonate is added to the non-aqueous electrolyte solution, a good surface layer (a surface layer causing smooth lithium occlusion/release reactions on the negative electrode active material surface and at the same time hindering side reactions) can be formed on the surface of the silicon particle negative electrode active material. Therefore, uniformity in the charge-discharge reactions improves, hindering the deterioration due to fractures and alterations of the silicon particles.

In addition, it was observed that Battery E3 of the invention, in which the non-aqueous electrolyte solution contained both carbon dioxide gas and fluoroethylene carbonate, showed better cycle performance than Batteries A1 and E2 of the invention, in which the non-aqueous electrolyte solution contained one of carbon dioxide gas or fluoroethylene carbonate. Therefore, it is particularly preferable that the non-aqueous electrolyte solution contain both carbon dioxide gas and fluoroethylene carbonate.

Sixth Group of Examples

In the Sixth Group of Examples, a study was conducted about how the physical properties of the negative electrode binder and the heat treatment temperature for the negative electrode affect the battery performance.

Example 1

A battery was fabricated in the same manner as described in Example 1 of the First Group of Examples, except that the negative electrode active material slurry was prepared as follows. The negative electrode active material particles were mixed with a precursor of a polyimide resin (the resin represented by the following chemical formula (3), hereinafter also referred to as a "polyimide resin B"), which was a polyamic acid varnish (the varnish represented by the following chemical formula (4), in which the solvent was NMP and the concentration was 16 mass %, based the amount of the polyimide resin B after imidization by the heat treatment for the negative electrode active material) so that the mass ratio of the negative electrode active material particles and the polyimide resin B after imidization became 90:10.

The battery fabricated in this manner is hereinafter referred to as Battery F1 of the invention.

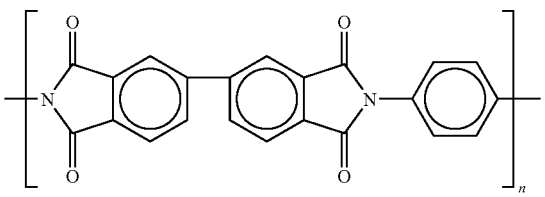

Chemical Formula (3)

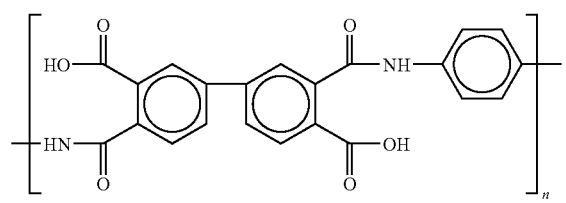

Chemical Formula (4)

Examples 2 to 4

Batteries were fabricated in the same manner as described in the foregoing Example 1 of the First Group of Examples, except that the negative electrodes were subjected to a heat treatment at 250° C. for 10 hours under an argon atmosphere, a heat treatment at 420° C. for 10 hours under an argon atmosphere, and a heat treatment at 480° C. for 10 hours under an argon atmosphere, respectively, in place of the heat treatment at 400° C. for 10 hours under an argon atmosphere.

The batteries fabricated in this manner are hereinafter referred to as Batteries F2 to F4 of the invention, respectively.

(Experiment 1)

The just-mentioned Batteries F1 to F4 of the invention were charged and discharged under the same conditions as described in the foregoing experiment of the First Group of Examples, to determine the cycle life for each of the batteries. The results are shown in Table 6 below. Table 6 also shows the cycle life of Battery A1 of the invention.

TABLE 6

| Battery | Negative electrode binder | | Heat treatment temperature for negative electrode (° C.) | Cycle life (times) |
|---|---|---|---|---|
| | Type | Glass transition temperature (° C.) | | |
| F1 | Polyimide resin B | 530 | 400 | 279 |
| F2 | Polyimide resin A | 285 | 250 | 306 |
| A1 | | | 400 | 450 |
| F3 | | | 420 | 441 |
| F4 | | | 480 | 405 |

The results shown in Table 6 clearly demonstrate that Batteries A1, F3, and F4 of the invention, in which the negative electrodes were heat-treated at temperatures higher than the glass transition temperature of the negative electrode binder, exhibited better cycle performance than Batteries of the invention F1 and F2, in which the negative electrodes were heat-treated at temperatures lower than the glass transition temperatures of the negative electrode binders.

It is believed that when the electrode heat treatment was conducted at a temperature higher than the glass transition temperature of the negative electrode binder, the binder underwent heat-bonding so that the binder got into the surface irregularities of the polycrystalline silicon particles and the surface irregularities of the negative electrode current collector; as a result, the anchoring effect of the binder was exerted more significantly, and high adhesion was exhibited.

In particular, it is demonstrated that Batteries A1 and F3 of the invention, in which the electrode heat treatment was performed at a temperature lower than 450° C., exhibited even better cycle performance than Battery F4 of the invention, in which the electrode heat treatment was performed at a temperature higher than 450° C.

After the test, each of the negative electrode current collectors was observed. No deformation was observed in the negative electrode current collector for Batteries A1 and F3 of the invention, in which the electrode heat treatment was performed at a temperature lower than 450° C. On the other hand, deformation occurred in the negative electrode current collector after the test for Battery F4 of the invention, in which the electrode heat treatment was performed at a temperature higher than 450° C. Thus, the mechanical strength degradation of the negative electrode current collector due to annealing was considerable in Battery F4 of the invention because the electrode heat treatment was performed at a temperature higher than 450° C. As a consequence, the negative electrode current collector was deformed, so the adhesion strength decreased at the interface between the negative electrode active material layer and the negative electrode current collector, resulting in the lower cycle performance.

(Experiment 2)

The physical properties (imidization ratio and glass transition temperature) of the binder resin B were measured in the same manner as described in the foregoing Experiment 3 of the First Group of Examples.

As a result, it was found that the imidization ratio of the binder resin B was 100% and the glass transition temperature was 530° C.

Other Embodiments (1) Although silicon particles were used as the negative electrode active material particles in the foregoing examples, it is of course possible to use silicon alloy particles as well as a mixture of silicon particles and silicon alloy particles, as the negative electrode active material particles. It is also possible to add carbonaceous material particles and the like to the foregoing particles.

(2) The lithium salt of the electrolyte solution is not limited to $LiPF_6$, and various other substances may be used, including $LiBF_4$, $LiAsF_6$, $LiCF_3SO_3$, $LiN(C_lF_{2l+1}SO_2)(C_mF_{2m+1}SO_2)$ (where l and m are integers equal to or greater than 0), $LiC(C_pF_{2p+1}SO_2)(C_qF_{2q+1}SO_2)(C_rF_{2r+1}SO_2)$ (where p, q, and r are integers equal to or greater than 0), which may be used either alone or in combination of two or more of them. Although the concentration of the lithium salt is not particularly limited, it is desirable that the concentration of the lithium salt be controlled within the range of from 0.5 moles to 1.5 moles per 1 liter of the electrolyte solution.

(3) The solvents for the electrolyte solution are not particularly limited to ethylene carbonate (EC) and diethyl carbonate (DEC) mentioned above, it is preferable that the electrolyte solution contain at least one type of cyclic carbonic ester compound having a C=C unsaturated bond.

Examples of such cyclic carbonic ester compounds include vinylene carbonate, 4,5-dimethyl vinylene carbonate, 4,5-diethyl vinylene carbonate, 4,5-dipropyl vinylene carbonate, 4-ethyl-5-methyl vinylene carbonate, 4-ethyl-5-propyl vinylene carbonate, 4-methyl-5-methyl vinylene carbonate, vinyl ethylene carbonate, and divinyl ethylene carbonate. When the electrolyte solution contains a cyclic carbonic ester compound having a C=C unsaturated bond as described above, a chemically stable surface layer forms on the negative electrode, preventing the deposition of the transition metal that dissolves away from the positive electrode.

In addition, in order to enhance the effect of the formation of the surface layer and to improve the quality of the surface layer, it is preferable that the solvent contain $CO_2$ or a carbonate containing fluorine. Examples of such solvents include fluoroethylene carbonate and trifluoromethylpropylene carbonate.

Preferable examples of the solvents for the electrolyte solution used in the present invention, to further enhance the effect of the surface layer formation resulting from the cyclic carbonic ester compound having a C=C unsaturated bond, include carbonate-based solvents such as ethylene carbonate, propylene carbonate, diethyl carbonate, ethyl methyl carbonate, and dimethyl carbonate. More preferable is a combination of a cyclic carbonate and a chain carbonate.

(4) The present invention may be applied not only to liquid-type batteries but also to gelled polymer batteries. In this case, usable examples of the polymer materials include polyether-based solid polymer, polycarbonate-based solid polymer, polyacrylonitrile-based solid polymer, oxetane-based polymer, epoxy-based polymer, and copolymers or cross-linked polymers comprising two or more of these polymers, as well as PVDF. Any of the above examples of the polymer materials may be used in combination with a lithium salt and an electrolyte, to form a gelled solid electrolyte.

INDUSTRIAL APPLICABILITY

The present invention is suitable for driving power sources for mobile information terminals such as mobile telephones, notebook computers, and PDAs, especially for use in applications that require a high capacity.

DESCRIPTION OF REFERENCE NUMERALS

Figure 1:
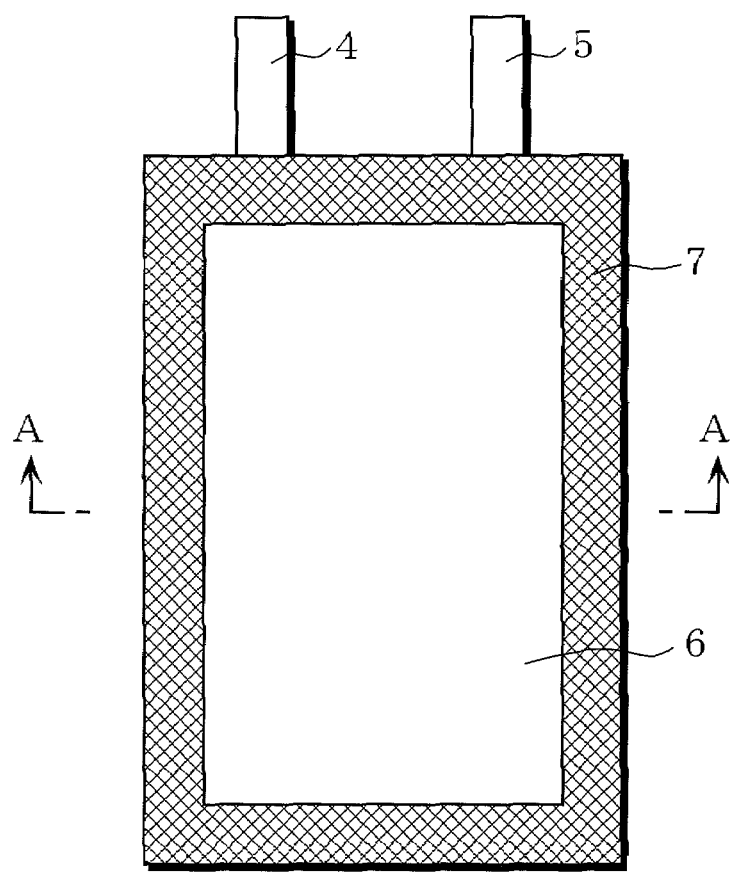
FIG. 1 is a front view of the battery according to one embodiment of the present invention.
Figure 2:
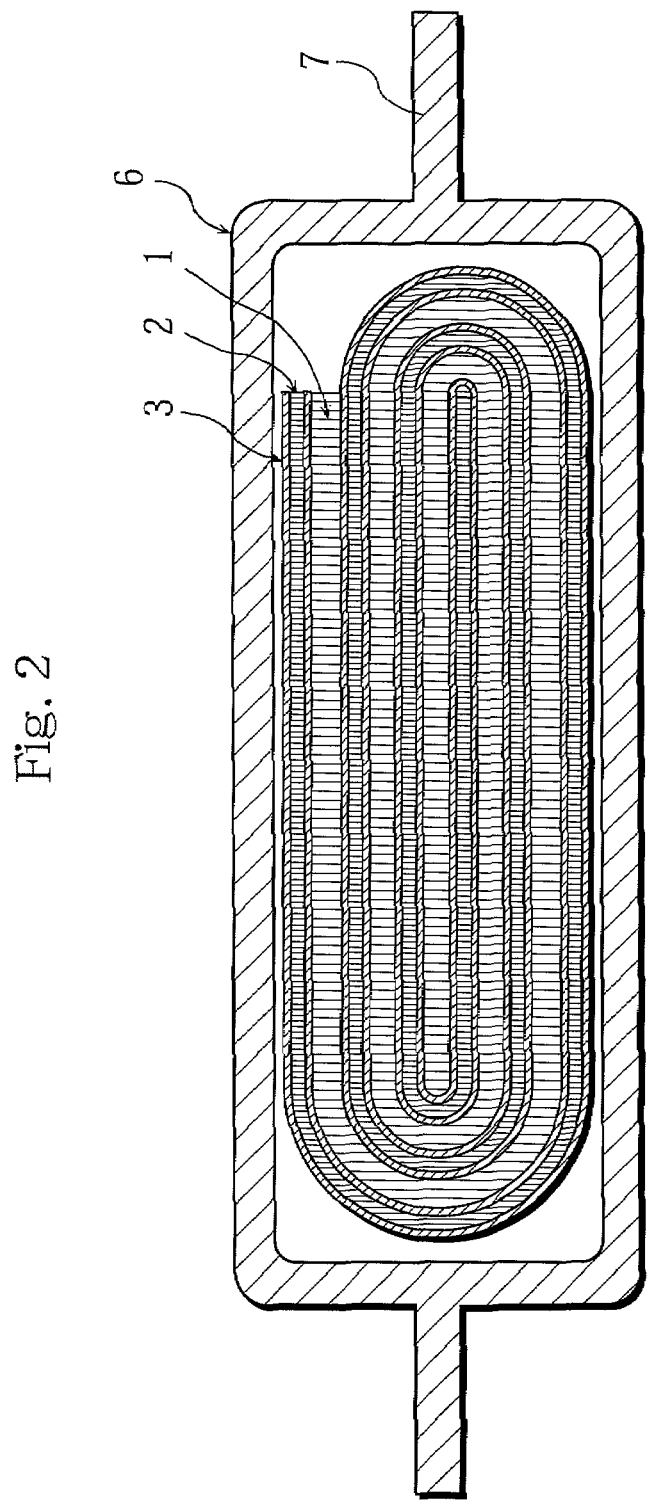
FIG. 2 is a cross-sectional view taken along line A-A in FIG. 1.
Figure 3:
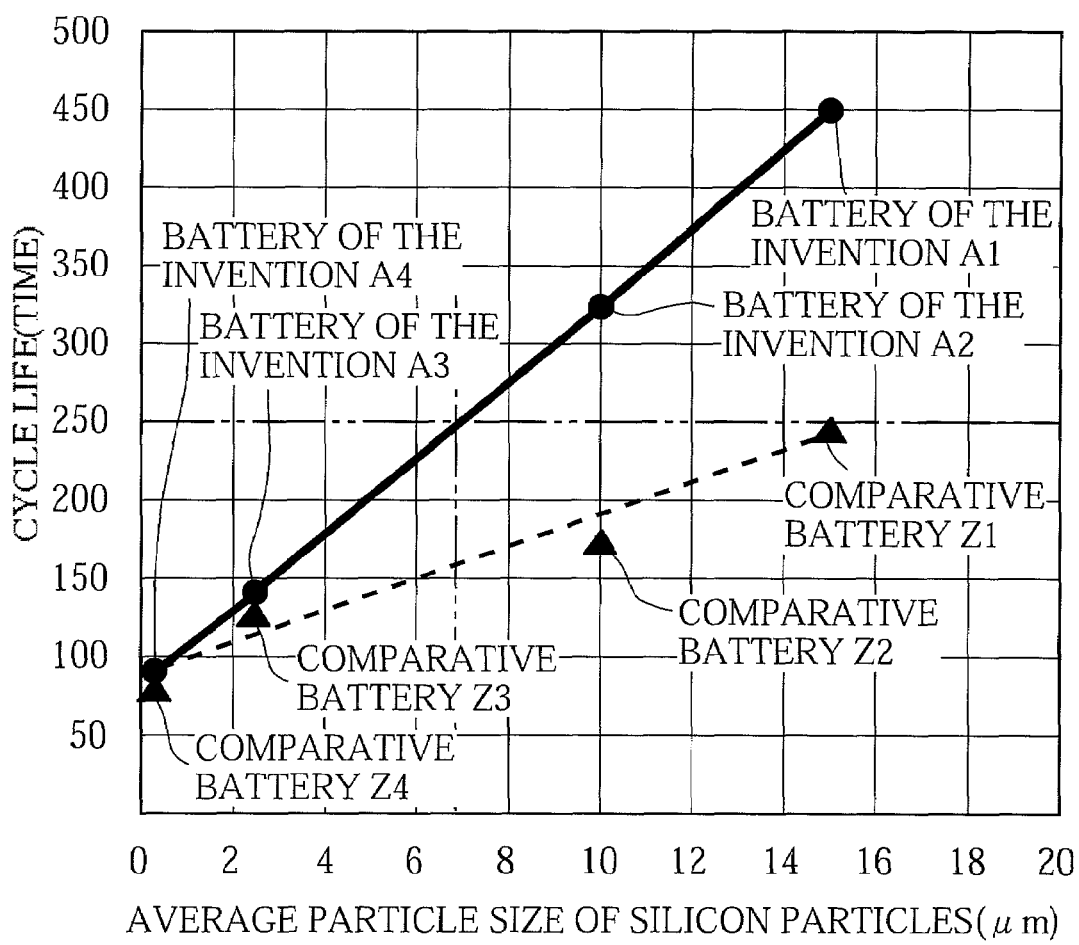
FIG. 3 is a graph illustrating the relationship between average particle size of silicon particles and cycle life.
Figure 4:
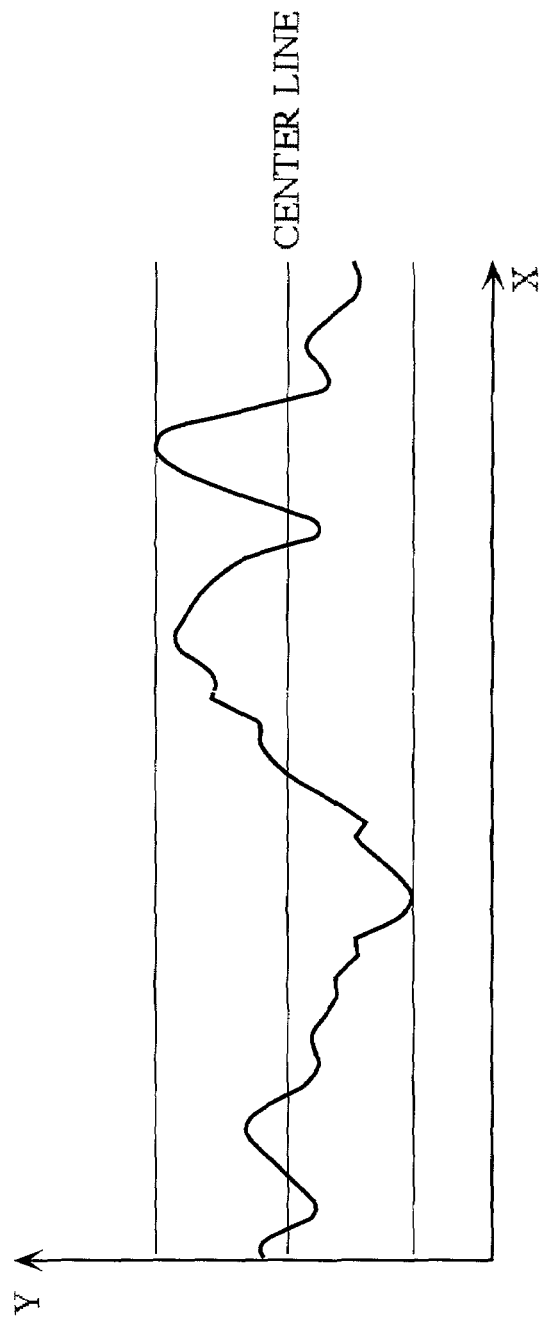
FIG. 4 is a graph for illustrating surface roughness Ra.
Figure 5:
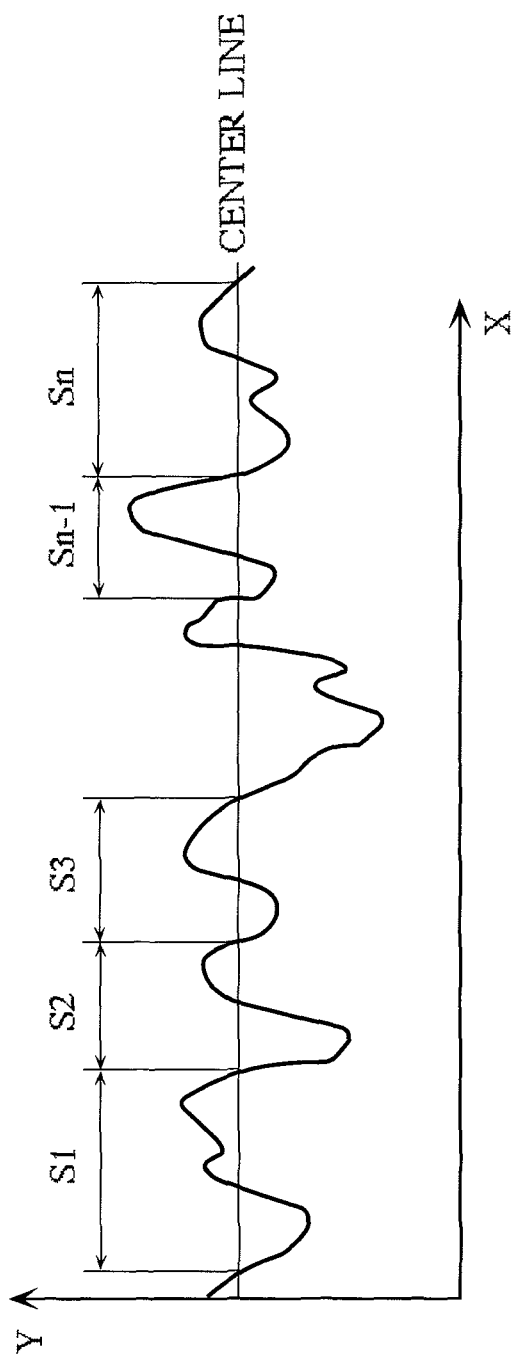
FIG. 5 is a graph for illustrating mean spacing of local peaks S.
Figure 6:
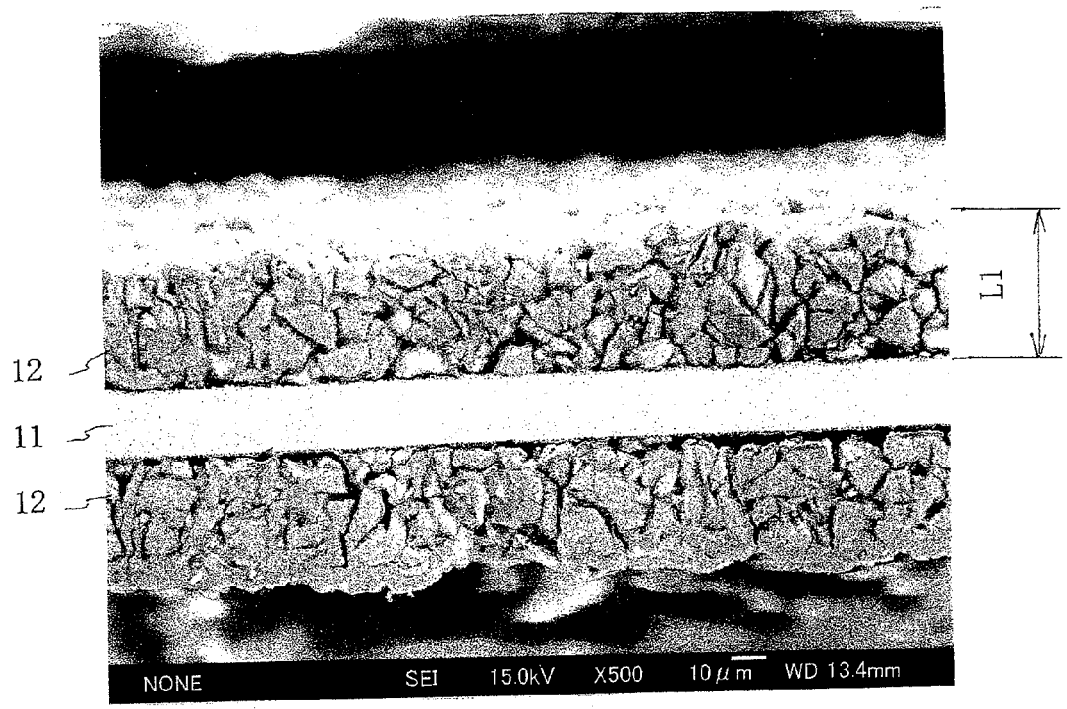
FIG. 6 is a photograph illustrating a cross section of the negative electrode of Battery A1 according to the present invention after the 300th cycle.
Figure 7:
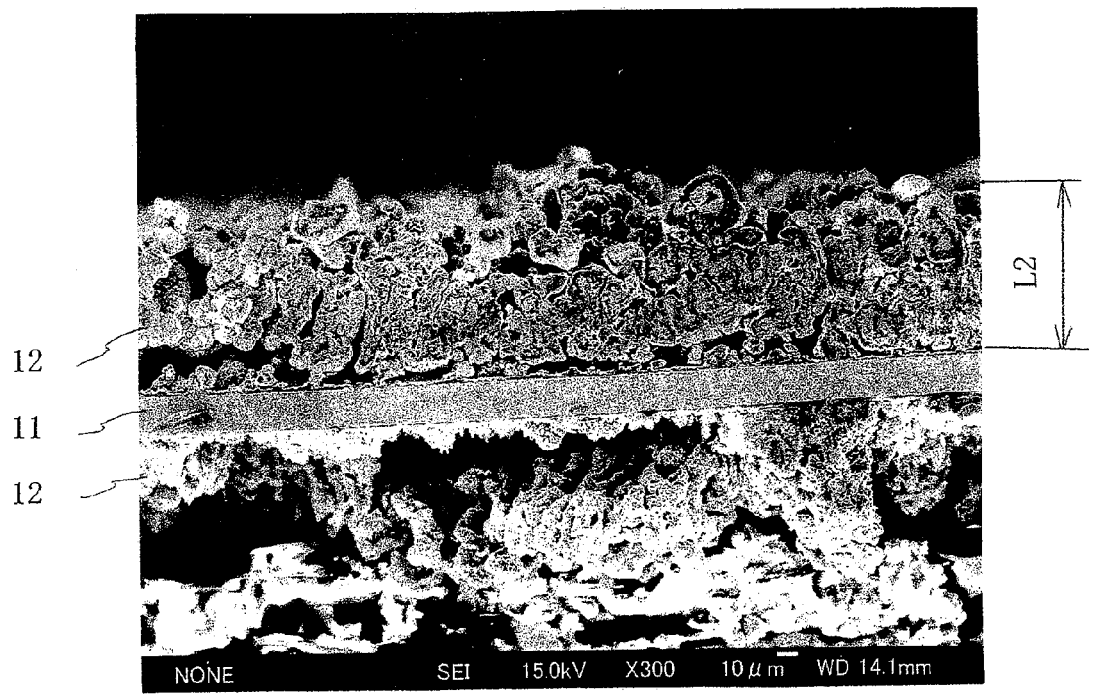
FIG. 7 is a photograph illustrating a cross section of the negative electrode of Comparative Battery Z1 after the 300th cycle.

1: positive electrode
2: negative electrode
3: separator
11: negative electrode current collector 12: negative electrode active material layer

The invention claimed is:

1. A lithium secondary battery comprising:
a negative electrode having a negative electrode current collector and a negative electrode active material layer disposed on the negative electrode current collector, the negative electrode active material layer comprising a negative electrode binder and negative electrode active material particles consisting of silicon particles;
a positive electrode having a positive electrode active material;
a separator; and
a non-aqueous electrolyte, wherein
the silicon particles have a crystallite size of 100 nm or less,
the silicon particles have an average particle size of from 7 μm to 25 μm;
the silicon particles have a particle size distribution in which D10 is 5 μm or greater and D90 is 23 μm or less;
the silicon particles are polycrystalline silicon particles; and
the polycrystalline silicon particles have crystallites oriented in random directions.

2. The lithium secondary battery according to claim 1, wherein the polycrystalline silicon particles have a crystallite size of 60 nm or less.

3. The lithium secondary battery according to claim 1, wherein the negative electrode active material particles are composed of the polycrystalline silicon particles, and the polycrystalline silicon particles are composed of silicon having a purity of 95 mass % or greater.

4. The lithium secondary battery according to claim 3, wherein the polycrystalline silicon particles contain oxygen and, as an impurity, at least one element selected from the group consisting of phosphorus, and boron.

5. The lithium secondary battery according to claim 1, wherein the negative electrode active material layer has a thickness of 40 μm or less.

6. The lithium secondary battery according to claim 1, wherein the negative electrode binder is a polyimide.

7. The lithium secondary battery according to claim 1, wherein the positive electrode active material contains a lithium-transition metal composite oxide, and a theoretical electrical capacity ratio of the positive electrode to the negative electrode is 1.2 or less.

8. The lithium secondary battery according to claim 1, wherein the non-aqueous electrolyte contains $CO_2$ and/or fluoroethylene carbonate.

9. A lithium secondary battery comprising:
a negative electrode having a negative electrode current collector and a negative electrode active material layer disposed on the negative electrode current collector, the negative electrode active material layer comprising a negative electrode binder and negative electrode active material particles consisting essentially of silicon particles;
a positive electrode having a positive electrode active material;
a separator; and
a non-aqueous electrolyte, wherein
the silicon particles have a crystallite size of 100 nm or less,
the silicon particles have an average particle size of from 7 μm to 25 μm;
the silicon particles have a particle size distribution in which D10 is 5 μm or greater and D90 is 23 μm or less;
the silicon particles are polycrystalline silicon particles; and
the polycrystalline silicon particles have crystallites oriented in random directions.

10. The lithium secondary battery according to claim 9, wherein the polycrystalline silicon particles have a crystallite size of 60 nm or less.

11. The lithium secondary battery according to claim 9, wherein the negative electrode active material particles are composed of polycrystalline silicon particles, and the polycrystalline silicon particles are composed of silicon having a purity of 95 mass % or greater.

12. The lithium secondary battery according to claim 11, wherein the polycrystalline silicon particles contain oxygen and, as an impurity, at least one element selected from the group consisting of phosphorus, and boron.

13. The lithium secondary battery according to claim 9, wherein the negative electrode active material layer has a thickness of 40 μm or less.

14. The lithium secondary battery according to claim 9, wherein the negative electrode binder is a polyimide.

15. The lithium secondary battery according to claim 9, wherein the positive electrode active material contains a lithium-transition metal composite oxide, and a theoretical electrical capacity ratio of the positive electrode to the negative electrode is 1.2 or less.

16. The lithium secondary battery according to claim 9, wherein the non-aqueous electrolyte contains $CO_2$ and/or fluoroethylene carbonate.

* * * * *